Nov. 29, 1938.   J. H. JOHNSON   2,138,378
METHOD AND MEANS OF MAKING STRIPPED RUBBER PRODUCTS
Filed Feb. 13, 1935
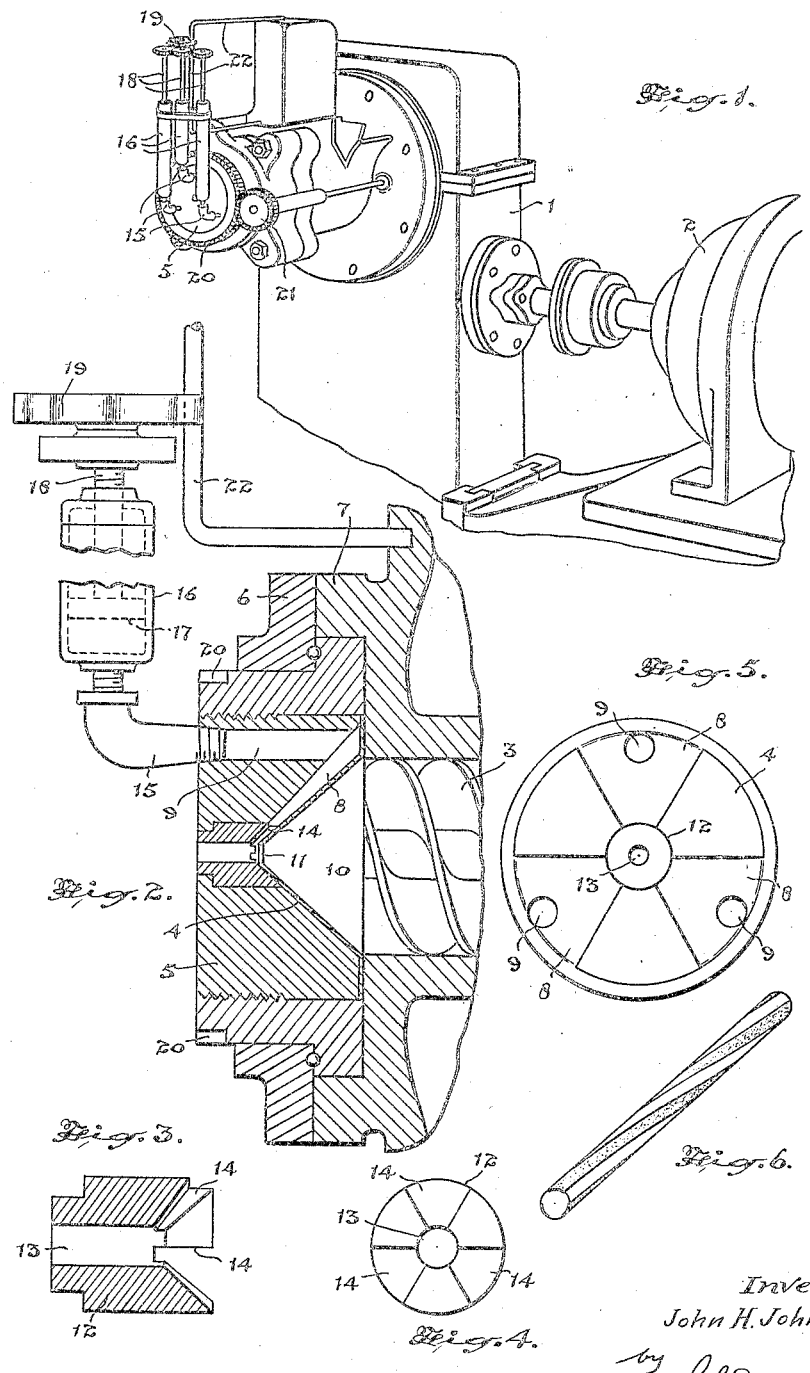
Inventor.
John H. Johnson Patented Nov. 29, 1938

2,138,378

UNITED STATES PATENT OFFICE 2,138,378

METHOD AND MEANS OF MAKING STRIPED RUBBER PRODUCTS

John Herbert Johnson, Toronto, Ontario, Canada

Application February 13, 1935, Serial No. 6,401
In Great Britain February 21, 1934

6 Claims. (Cl. 18—13)

In the manufacture of rubber products of forms produced in continuous lengths such as tubing and various forms of strips, it is desirable to produce same in a vari-coloured design, and the principal object of this invention is to provide a simple but effective method and means for placing stripes of coloured rubber material upon the surface of a continuous strip of rubber material extruded from a forming machine in such a manner that the coloured strip will be an intimate and homogeneous part of the main member.

The principal feature of the invention consists in shaping vulcanizable rubber material into strips of a desired cross sectional form and applying in an undulating path to the surface of the strip, a secondary strip or strips of rubber material of a contrasting colour to be intimately and homogeneously united therewith while the main body strip is confined within the die throat.

A further and important features of the invention is to devise a means for applying the striping of coloured rubber material in ordinary types of extruding or tubing machines.

In the accompanying drawing,

Figure 1 is a perspective view of a portion of a tubing machine illustrating the application of the present invention thereto.

Figure 2 is an enlarged longitudinal sectional detail of the head of the machine showing the arrangement of the extruding die therein.

Figure 3 is a further enlarged longitudinal sectional detail of the stripe-applying die.

Figure 4 is an end elevational view of the stripe-applying die.

Figure 5 is an elevational view of the inner concaved conical face of the extruding head with the inner shield removed.

Figure 6 is a perspective view of a piece of round rubber material striped in accordance with this invention.

A practical means for putting the method herein described into effect is shown in the accompanying drawing.

The tubing or extruding device 1 is of a well known manufacture and the internal mechanism thereof is operated by a suitable motor 2 arranged at one side. The rubber material is fed by a spiral feed screw 3 into a conical recess 4 in the head 5, which head is secured in position by a holding ring 6 which engages the annular flange 7 of the head.

The inner wall of the conical recess 4 is formed with one or more channels 8 which converge inwardly to the central opening and each of these channels communicate with a passage 9 leading to the outer face of the head.

A conical shield 10 is arranged to cover the channels 8 and is provided with a central opening 11 which is of the shape of the strip to be extruded.

A die 12 is arranged in the head 5 and has an elongated smooth central orifice 13 therethrough which corresponds in shape to the opening 11 in the conical shield, and channels 14 are formed in this die at the inner end which form continuations of the channels 8 and open immediately adjacent to the opening 11 in the shield.

Connected with each of the passages 9 is a fitting 15, preferably of elbow form, and to the outer end of each of these fittings is connected a cylinder 16 in which is arranged a screw-fed plunger 17 which is provided with a spindle 18 projecting from the outer end of the cylinder and provided with means for turning the same. The cylinders 16 are adapted to contain a rubber mixture which is suitably coloured in contrast to the colour of the body or main strip, and the operation of the screw plunger forces this rubber material through the fittings 15 and passages 9 into the channels 8 which converge to meet the channels 14 in the die.

The feed screw 3 of the extruder device forces the mass of vulcanizable rubber material to form the body of the strip to be made into the conical shield 10, and the material flows through the opening of the size and shape of the finished strip.

The pressure applied to the material contained in the cylinders 16 is such as to force a thin ribbon of the different coloured material through the narrow channels 14. Consequently a thin narrow strip of rubber is laid on the surface of the extruded strip as it passes through the opening 11 in the shield, and the multi-coloured strip is then forced through the remaining die orifice, where it is crowded into embedded homogeneous relation to the main body strip forming a smooth surfaced striped product.

The spindles of the plunger 17 may be rotated slowly in any desirable manner to maintain the pressure on the material contained therein sufficient to keep it feeding through the die orifices as described, but in the form illustrated the several cylinders 16 are arranged parallelly, and intermeshing spur gears are arranged on the outer ends of the spindles, while one of the spindles is provided with a star wheel 19.

In order to accomplish the spiral arrangement of colour striping the head 5 is provided with spur teeth 20 on the perimeter projecting beyond the holding ring 6 and a spur pinion 21, suitably driven from the extruder machine, meshes with the spur teeth 20 and rotates the head at a desired rate of speed. The cylinders 16 are carried with the head and one or more members 22 fixed on the casing are arranged to engage the star wheel 19 to turn it gradually as the head revolves so that two operations are performed at the one time, that is, by rotating the head the striped strip will be twisted to present a spiral appearance and the rotation of the head to accomplish the twisting automatically feeds the striping rubber into the die.

It has not been deemed necessary to show any particular form of apparatus for applying pressure to the striping rubber material other than that herein shown, and it has been described that this pressure may be applied manually and it is within the purview of the skilled mechanic to arrange suitable means connected with the moving mechanism of the tubing machine to apply pressure to the stripe-forming material to feed same through the die in the manner described.

Further, while cylinders with separate pressure feed screws are shown for feeding in the striping rubber compound to the channels in the die, it will be readily appreciated that many different forms of mechanisms may be devised to apply sufficient pressure to this rubber material to force it through the die channels.

What I claim as my invention is:—

1. Means for making striped rubber products by the extrusion process in which a main body core has a strip or strips applied to the surface thereof during extrusion, comprising in combination, means forming a body-extruding throat, a rotating die head having a cavity or cavities leading to the body extruding throat, and means for feeding body-forming material through said throat, means for feeding contrastingly-coloured material through said cavities to be carried in a spiral path about the axis of the cavity during rotation of the die head to deposit the said secondary material in a spiral path or paths on the surface of the main extruded body.

2. A method of making striped rubber products consisting in forcing rubber material through a die, and concurrently feeding a strip or strips of rubber material of a contrasting colour to said rubber strip in the forming die, and effecting a one-way rotation of the forming die at a rate proportional to the rate of feed of said strip or strips to produce a uniform spirally striped product.

3. Means for making striped rubber products comprising a die having a central forming orifice and a plurality of channels converging thereto, reservoirs connected with each of said channels, pressure means for forcing material from said reservoirs through said channels, separate pressure means for forcing rubber material through said die, said die being rotatably mounted, and means for establishing an operative connection between said rotatable die and said first-mentioned pressure means to effect the operation of the latter at a rate proportional to the rate of operation of the said die.

4. Means as claimed in claim 3 in which said die is rotatable and supply reservoirs for the striping material are mounted directly on the rotating die head and move in unison therewith and being connected to the respective head cavities, pressure applying means being associated with said supply reservoirs operable during their travel with the head.

5. Means as claimed in claim 3 in which the first-mentioned pressure means and the means for establishing an operative connection includes interengageable members one mounted in a stationary position and the other carried by the rotating head and engaged by the stationary member periodically during rotation of the die head.

6. A means for forming rubber products as claimed in claim 3 in which the first-mentioned pressure means comprises screw fed pressure means provided with threaded pistons operating in cylinders containing a striping material and mounted on the die head, and means is provided for rotating said die head and for rotating said threaded pistons.

JOHN HERBERT JOHNSON.